(12) United States Patent
Mano et al.

(10) Patent No.: US 12,203,622 B2
(45) Date of Patent: Jan. 21, 2025

(54) VEHICLE LAMP SYSTEM AND LIGHT DISTRIBUTION CONTROLLER

(71) Applicant: KOITO MANUFACTURING CO., LTD., Tokyo (JP)

(72) Inventors: Mitsuharu Mano, Shizuoka (JP); Hirotaka Sawada, Shizuoka (JP); Naoki Kawabata, Shizuoka (JP); Keisuke Inagaki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 224 days.

(21) Appl. No.: 18/062,278

(22) Filed: Dec. 6, 2022

(65) Prior Publication Data

US 2023/0096367 A1    Mar. 30, 2023

Related U.S. Application Data

(63) Continuation of application No. PCT/JP2021/021722, filed on Jun. 8, 2021.

(30) Foreign Application Priority Data

Jun. 9, 2020 (JP) ................................. 2020-100453
Jun. 9, 2020 (JP) ................................. 2020-100454

(51) Int. Cl.
*F21S 41/663* (2018.01)
*B60Q 1/14* (2006.01)
(Continued)

(52) U.S. Cl.
CPC .......... *F21S 41/663* (2018.01); *B60Q 1/1438* (2013.01); *F21S 41/143* (2018.01); *F21S 41/153* (2018.01); *H05B 47/155* (2020.01)

(58) Field of Classification Search
None
See application file for complete search history.

(56) References Cited

U.S. PATENT DOCUMENTS 11,477,871 B2 * 10/2022 Ichikawa ............... H05B 45/46
11,558,943 B2 *  1/2023 Ichikawa ............... H05B 47/10
(Continued)

FOREIGN PATENT DOCUMENTS

| | | |
|---|---|---|
| JP | 2018172038 A | 11/2018 |
| WO | 2019028483 A1 | 2/2019 |
| WO | 2019198604 A1 | 10/2019 |

OTHER PUBLICATIONS

Office Action (Communication pursuant to Rule 164(1) EPC/The Partial Supplementary European Search Report) issued on Sep. 20, 2023, in corresponding European Patent Application No. 21823052.2. (11 pages).
(Continued)

*Primary Examiner* — Srinivas Sathiraju
(74) *Attorney, Agent, or Firm* — BUCHANAN, INGERSOLL & ROONEY PC

(57) ABSTRACT

A light distribution controller controls a light distribution variable lamp including a plurality of pixels arranged in an array. The processor executes the software program to generate at least one image defining the light distribution of the light distribution variable lamp, and writes the image in the volatile memory. A monitoring microcontroller detects an abnormality of the processor. A hardware logic circuit (i) generates a light distribution image data to be output to the light distribution variable lamp on the basis of at least one image written in the volatile memory in a normal state of the processor, and (ii) generates a light distribution image data on the basis of the generated auxiliary image without depending on the processor in an abnormal state of the processor.

24 Claims, 13 Drawing Sheets

(51) Int. Cl.
*F21S 41/143* (2018.01)
*F21S 41/153* (2018.01)
*H05B 47/155* (2020.01)

(56) References Cited

U.S. PATENT DOCUMENTS

| | | | | |
|---|---|---|---|---|
| 11,653,434 | B2* | 5/2023 | Ichikawa | H05B 47/10 |
| | | | | 315/161 |
| 2001/0012206 | A1* | 8/2001 | Hayami | B60Q 1/14 |
| | | | | 362/465 |
| 2009/0052156 | A1* | 2/2009 | Mano | B60Q 1/122 |
| | | | | 362/37 |
| 2011/0141753 | A1* | 6/2011 | Tanaka | F21S 41/689 |
| | | | | 362/464 |
| 2011/0317439 | A1* | 12/2011 | Yamazaki | B60Q 1/115 |
| | | | | 362/465 |
| 2013/0107559 | A1* | 5/2013 | Gava | F21S 41/645 |
| | | | | 362/539 |
| 2015/0142275 | A1* | 5/2015 | Yamazaki | B60Q 1/115 |
| | | | | 701/49 |
| 2015/0264754 | A1* | 9/2015 | Ito | H05B 45/3725 |
| | | | | 315/83 |
| 2016/0238209 | A1 | 8/2016 | Kimura | |
| 2018/0031200 | A1 | 2/2018 | Park et al. | |
| 2018/0072228 | A1* | 3/2018 | Mano | B60R 1/26 |
| 2018/0170240 | A1* | 6/2018 | Wama | B60Q 1/0023 |
| 2018/0372869 | A1* | 12/2018 | Namba | G01S 17/18 |
| 2019/0016274 | A1* | 1/2019 | Namba | H04N 23/10 |
| 2020/0215963 | A1 | 7/2020 | Lahmer | |
| 2020/0238892 | A1* | 7/2020 | Maruyama | B60Q 1/076 |
| 2020/0275542 | A1* | 8/2020 | Ichikawa | H05B 45/46 |
| 2023/0013166 | A1* | 1/2023 | Kawabata | H05B 47/105 |
| 2023/0096367 | A1* | 3/2023 | Mano | H05B 47/17 |
| | | | | 362/543 |
| 2024/0294111 | A1* | 9/2024 | Terayama | F21S 41/663 |

OTHER PUBLICATIONS

Extended European Search Report dated Dec. 4, 2023, issued in corresponding European Application No. 21823052.2. (13 pages).
International Preliminary Report on Patentability Chapter I (PCT/IB/373) and Written Opinion (PCT/ISA/237) mailed on Dec. 13, 2022, by the International Bureau of WIPO in corresponding International Patent Application No. PCT/JP2021/021722. (12 pages).
International Search Report (PCT/ISA/210) with English translation mailed on Aug. 24, 2021, by the Japan Patent Office as the International Searching Authority for International Application No. PCT/JP2021/021722. (10 pages).

* cited by examiner

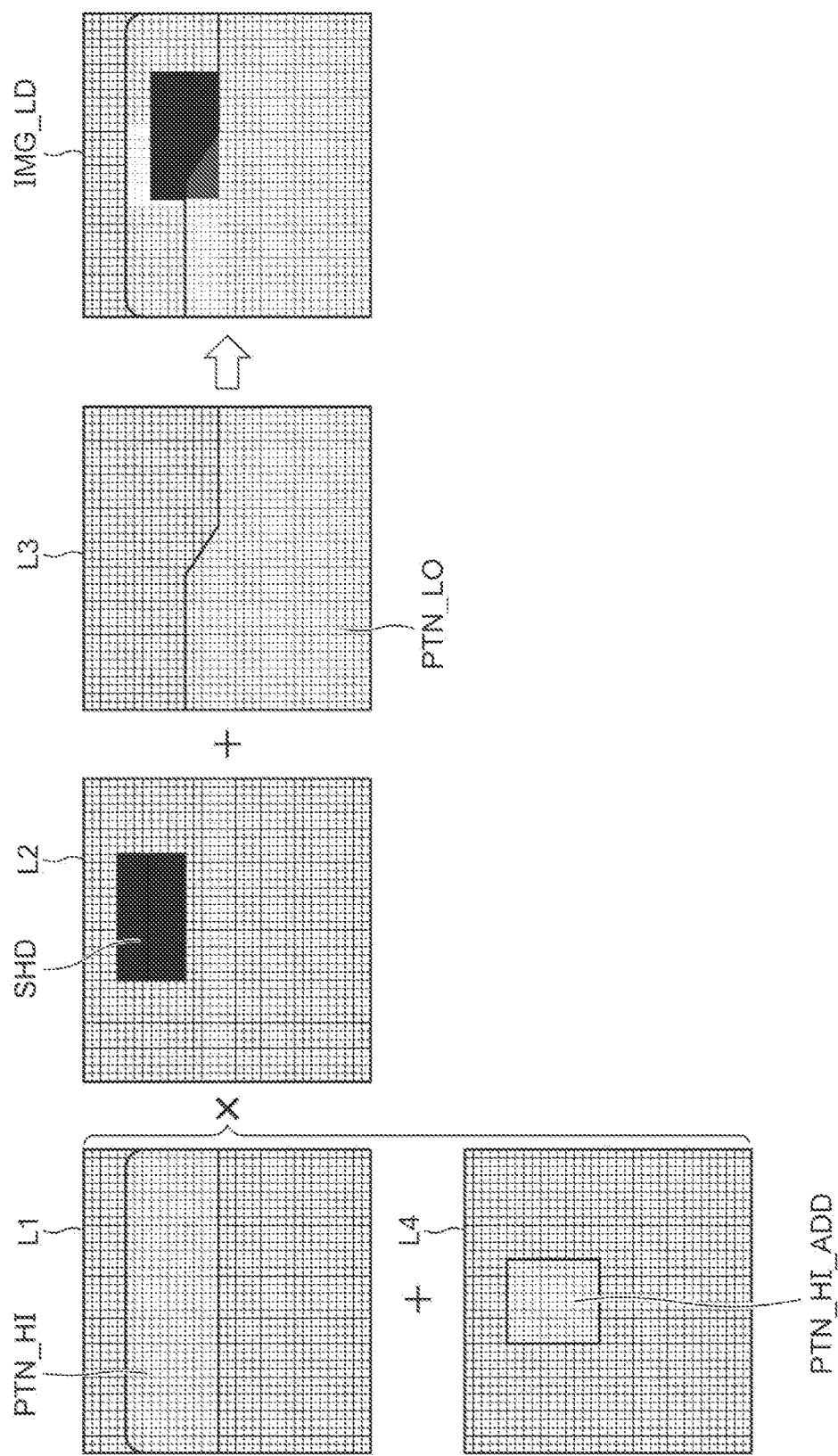

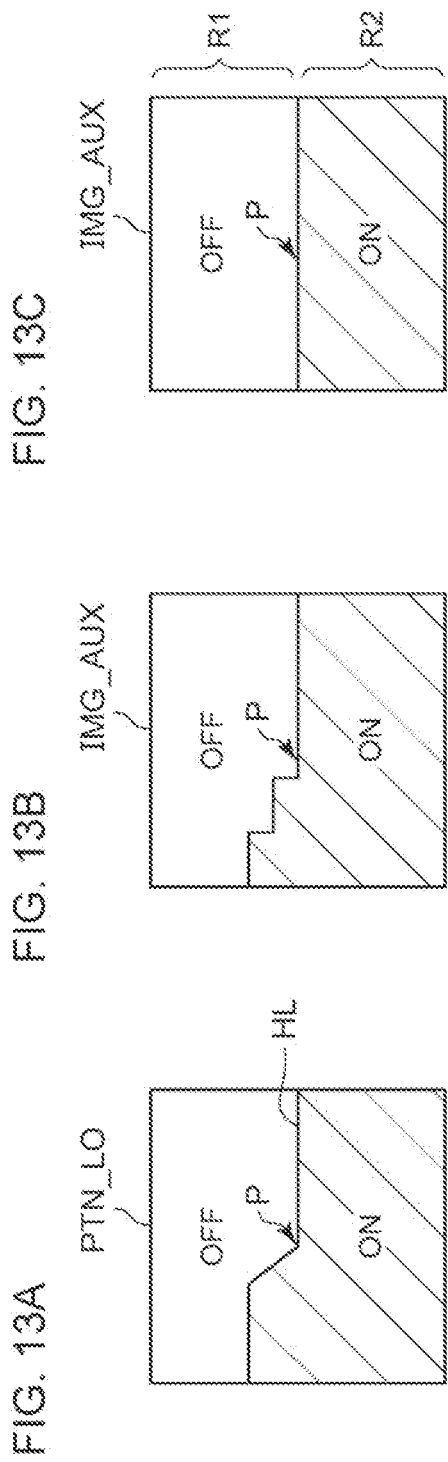

VEHICLE LAMP SYSTEM AND LIGHT DISTRIBUTION CONTROLLER

BACKGROUND

1. Technical Field

The present disclosure relates to a vehicle lamp.

2. Description of the Related Art

A vehicle lamp can generally switch between a low beam and a high beam. The low beam illuminates a vicinity of a host vehicle with a predetermined illuminance, and a light distribution regulation is defined so as not to give glare to an oncoming vehicle or a preceding vehicle, and is mainly used when traveling in an urban area. In contrast, the high beam illuminates a wide range and a far range ahead with relatively high illuminance, and is mainly used when traveling at a high speed on a road on which there are few oncoming vehicles and preceding vehicles. Therefore, although the high beam is more excellent in visibility for a driver than the low beam, there is a problem that glare is given to a driver and a pedestrian present ahead of the vehicle.

In recent years, an adaptive driving beam (ADB) that dynamically and adaptively controls a light distribution pattern of a high beam on the basis of a surrounding state of a vehicle has been proposed. The ADB technology detects the presence or absence of a preceding vehicle, an oncoming vehicle, or a pedestrian ahead of a vehicle, and reduces glare given to the vehicle or the pedestrian by dimming or turning off a region corresponding to the vehicle or the pedestrian.

An LED (light emitting diode) array type lamp has been proposed as an ADB lamp. FIG. 1 is a block diagram of an ADB lamp of an LED array type. An ADB lamp 1 includes an LED array 10, a light distribution controller 20, and a power supply circuit 30. The LED array 10 includes a plurality of LEDs 12 arranged in an array and an LED driver 14 that drives the plurality of LEDs 12. Each LED 12 corresponds to a pixel. The LED driver 14 includes a current source (switch) corresponding to each pixel, and switches on and off each pixel by controlling on and off of the current source.

The power supply circuit 30 supplies the power supply voltage $V_{DD}$ to the LED array 10. The light distribution controller 20 generates a control signal specifying on/off of the plurality of pixels, and transmits the control signal to the LED array 10. The emission beam of the LED array 10 is emitted onto a virtual vertical screen 40 through an optical system (not illustrated). A light distribution pattern 42 corresponding to on and off of the plurality of light emitting elements 12 is formed on the virtual vertical screen 40.

Problem 1: If the processing of generating the light distribution pattern in the light distribution controller 20 is left to only a software-controlled microcontroller, the LED array 10 cannot be controlled when the microcontroller becomes inoperable.

Problem 2: In a system in which the resolution of the LED array 10 is low, it is possible to generate a light distribution pattern using a general-purpose microcontroller.

However, when the resolution of the LED array 10 becomes high (for example, exceeds 100×100), the general-purpose microcontroller cannot catch up with the processing, and the architecture of the low-resolution system cannot be used as it is.

SUMMARY

The present disclosure has been made in such a situation.

1. Certain aspects of the present disclosure relate to a light distribution controller structured to control a light distribution variable lamp including a plurality of pixels arranged in an array. A light distribution controller includes a memory, a processor that generates at least one image defining a light distribution of a light distribution variable lamp by executing a software program and writes the image in the memory, an abnormality detector that detects an abnormality of the processor, and a hardware logic circuit that (i) generates light distribution image data to be output to the light distribution variable lamp on the basis of the at least one image written in the memory in a normal state of the processor, and (ii) generates light distribution image data on the basis of an auxiliary image generated independently of the processor in an abnormal state of the processor.

2. Certain aspects of the present disclosure relate to a light distribution controller structured to control a light distribution variable lamp including a plurality of pixels arranged in an array. A light distribution controller includes: a memory including a first region, a second region, and a third region; a processor capable of writing a first layer image defining a light distribution of a high beam in the first region of the memory, writing a second layer image defining a light-shielding portion of the high beam in the second region of the memory, and writing a third layer image defining a light distribution of a low beam in the third region of the memory by executing a software program; and a hardware logic circuit that reads the first layer image to the third layer image stored in the memory, and synthesizes the first layer image to the third layer image to generate light distribution image data.

Note that any combination of the above constituent elements and mutual replacement of the constituent elements and expressions of the present disclosure among methods, apparatuses, systems, and the like are also effective as aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 7 is a diagram for explaining light distribution control of a high beam;

FIG. 13A is a diagram illustrating an ideal light distribution pattern PTN_LO of a low beam, and FIGS. 13B and 13C are diagrams illustrating an example of an auxiliary image IMG_AUX.

DETAILED DESCRIPTION OUTLINE OF EMBODIMENT

Figure 1:
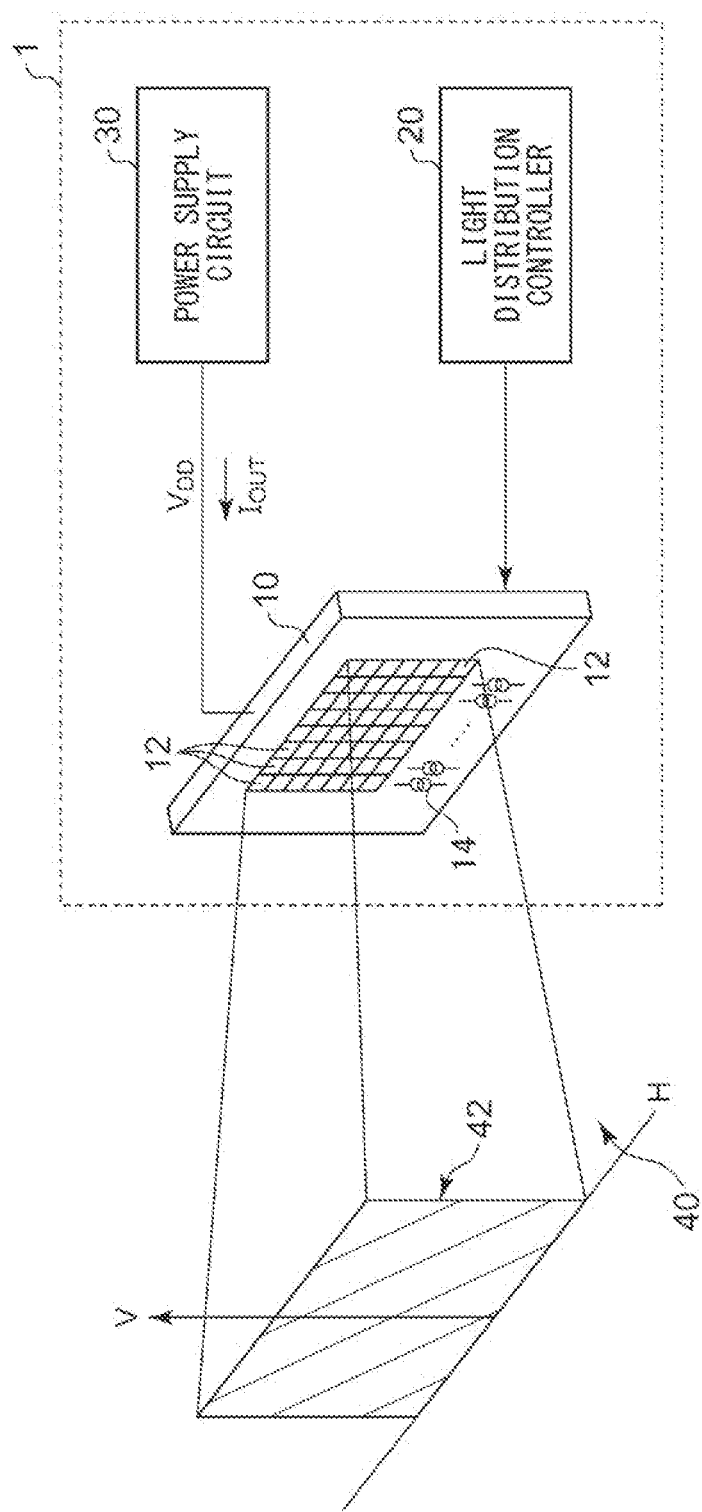
FIG. 1 is a block diagram of an ADB lamp of an LED array type.

An overview of some exemplary embodiments of the present disclosure will be described. This summary describes some concepts of one or more embodiments in a simplified manner for the purpose of basic understanding of the embodiments as a prelude to the detailed description that follows, and does not limit the breadth of the invention or disclosure. This summary is not a comprehensive overview of all possible embodiments, and is not intended to identify key elements of all embodiments or delineate the scope of some or all aspects. For convenience, "one embodiment" may be used to refer to one embodiment (example or modification) or a plurality of embodiments (examples or modifications) disclosed in the present description.

A light distribution controller according to one embodiment controls a light distribution variable lamp including a plurality of pixels arranged in an array. A light distribution controller includes a memory, a processor that generates at least one image defining a light distribution of a light distribution variable lamp by executing a software program and writes the image in the memory, an abnormality detector that detects an abnormality of the processor, and a hardware logic circuit that (i) generates light distribution image data to be output to the light distribution variable lamp on the basis of the at least one image written in the memory in a normal state of the processor, and (ii) generates light distribution image data on the basis of an auxiliary image generated independently of the processor in an abnormal state of the processor.

The light distribution controller can generate or acquire an auxiliary image defining a simple light distribution without using the processor in the abnormal state of the processor. Therefore, in the abnormal state of the processor, the light distribution image data can be generated on the basis of the auxiliary image, and the lighting of the light distribution variable lamp can be maintained.

In one embodiment, the at least one image generated by the processor may include a high beam image defining a light distribution of a high beam and a low beam image defining a light distribution of a low beam. The hardware logic circuit may synthesize the high beam image and the low beam image to generate the light distribution image data in a normal state of the processor.

In one embodiment, in the abnormal state of the processor, the hardware logic circuit may write an auxiliary image including a predetermined shape in a region of the memory in which the low-beam image is written.

According to this configuration, when an abnormality occurs in the processor, the hardware logic circuit writes the auxiliary image defining the simple low beam light distribution in the memory, and thereafter, the light distribution image data can be generated on the basis of the auxiliary image written by the hardware logic circuit, and the low beam lighting of the light distribution variable lamp can be maintained.

In one embodiment, in the abnormal state of the processor, the hardware logic circuit may directly output the auxiliary image as the light distribution image data without writing the auxiliary image in the memory. By reducing memory access, heat generation of the memory can be reduced. When the processor is in the abnormal state due to a high temperature, the processor can be prevented from being heated by the memory, and can be cooled in a short time.

In one embodiment, the abnormality detector may be further structured to be able to detect an abnormality in the memory. In the abnormal state of the memory, the hardware logic circuit may directly output the auxiliary image as the light distribution image data without writing the auxiliary image in the memory. As a result, the lighting of the light distribution variable lamp can be maintained even in the abnormal state of the memory.

In one embodiment, the auxiliary image may have a pixel value of 0 in a region above the horizontal line passing through an elbow point of the low beam distribution, and a pixel value of non-zero in a region below the horizontal line. The configuration of the hardware logic circuit can be simplified by simplifying the auxiliary image.

In one embodiment, the pixel values in a lower region of the auxiliary image may gradually change in a vertical direction. As a result, a steep brightness difference in the vicinity of the cut line can be reduced, and a light distribution that can be easily seen by the driver can be formed.

In one embodiment, the pixel values in the lower region of the auxiliary image may be uniform. As a result, the configuration of the hardware logic circuit can be further simplified.

In one embodiment, the pixel value in the lower region of the auxiliary image may be a minimum value of an upper limit value defined for each position in the low beam region. As a result, glare at the time of pitching can be prevented, and a situation in which the vicinity is too bright and it is difficult to see the distance can be avoided.

The abnormality detector may be a microcontroller. When the microcontroller detects an abnormality, the microcontroller may receive a low beam turn-on/off instruction from a host controller to control the hardware logic circuit.

The processor may write the light-shielding image defining the light-shielding portion of the high beam in the memory. The hardware logic circuit may generate the light distribution image data on the basis of the high beam image, the low beam image, and the light-shielding image.

A vehicle lamp system according to one embodiment may include a light distribution controller and a light distribution variable lamp controlled on the basis of a light distribution pattern generated by the light distribution controller.

A light distribution controller according to one embodiment controls a light distribution variable lamp including a plurality of pixels arranged in an array. A light distribution controller includes: a memory including a first region, a second region, and a third region; a processor capable of writing a first layer image defining a light distribution of a high beam in the first region of the memory, writing a second layer image defining a light-shielding portion of the high beam in the second region of the memory, and writing a third layer image defining a light distribution of a low beam in the third region of the memory by executing a software program; and a hardware logic circuit that reads the first layer image to the third layer image stored in the memory, and synthesizes the first layer image to the third layer image to generate light distribution image data.

In this configuration, the preprocessing of individually generating the first layer image to the third layer image respectively defining the high beam, the light-shielding portion of the high beam, and the low beam is executed by the processor, and a post-processing of synthesizing the first layer image to the third layer image is executed by the hardware logic circuit. As a result, the load on the processor can be reduced, and high-resolution light distribution pattern can be generated.

Each pixel of the second layer image may include an alpha value indicating the transmittance of the corresponding pixel of the first layer image. The hardware logic circuit may synthesize the first layer image and the third layer image on the basis of the alpha value of the second layer image. For the synthesis, alpha blending or addition synthesis can be used.

The alpha value of the second layer image may gradually change at a boundary of the light-shielding portion. As a result, a steep luminance change can be suppressed at the boundary of the light-shielding portion, and discomfort can be reduced.

The processor may generate the third layer image on the basis of the reference image defining the light distribution that is the basis of the low beam. By generating the reference image in advance and processing and correcting the reference image to generate the third layer image, the amount of calculation of the processor can be reduced as compared with the case of generating the third layer image from zero every time.

The reference image covers the irradiation range of the low beam, that is, a region wider than the irradiation range of the light distribution variable lamp, and the processor may crop a part of the reference image to generate the third layer image.

The reference image covers a region wider than the irradiation range of the low beam at least in a horizontal direction, and the processor may realize an electronic swivel by changing the horizontal crop position of the reference image.

The reference image covers a region wider than the irradiation range of the low beam at least in the vertical direction, and the processor may realize the leveling adjustment by changing the vertical crop position of the reference image.

The light distribution controller may further include a non-volatile memory that stores the reference image.

The memory may further include a fourth region. The processor may write the fourth layer image defining the light distribution of the high beam in the fourth region of the memory. The hardware logic circuit may synthesize the first layer image to the fourth layer image stored in the memory to generate the light distribution image data. There is a case where it is desired to change the light distribution of the high beam corresponding to various driving scenes. In this case, light distribution suitable for various traveling scenes can be generated by defining a light distribution serving as a base not depending on the traveling scene as the first layer image, defining an adaptive light distribution depending on the traveling scene as the fourth layer image, and synthesizing them. The memory capacity can be reduced as compared with a case where an individual light distribution (first layer image) is prepared for each traveling scene.

The processor may generate a pattern to be drawn in the fourth layer image by scaling the pattern to be drawn in the first layer image. For example, a fourth layer image may be generated by reducing the first layer image in the horizontal direction and synthesized with the original first layer image. As a result, light distribution suitable for high-speed traveling can be formed.

Embodiments

Hereinafter, preferred embodiments will be described with reference to the drawings. The same or equivalent constituent elements, members, and processes illustrated in the drawings are denoted by the same reference numerals, and redundant description will be omitted as appropriate. Furthermore, the exemplary embodiments are not intended to limit the disclosure and the invention, but are merely examples, and all features described in the exemplary embodiments and combinations thereof are not necessarily essential to the disclosure and the invention.

In the present description, "a state in which the member A is connected to the member B" includes not only a case where the member A and the member B are physically and directly connected to each other, but also a case where the member A and the member B are indirectly connected to each other via another member which does not substantially affect an electrical connection state between the member A and the member B or which does not impair a function or an effect exhibited by coupling between the member A and the member B.

Similarly, "a state in which the member C is provided between the member A and the member B" includes not only a case where the member A and the member C, or the member B and the member C are directly connected to each other, but also a case where the members are indirectly connected to each other via another member which does not substantially affect an electrical connection state between the member A and the member B or which does not impair a function or an effect exhibited by coupling between the member A and the member B.

Figure 2:
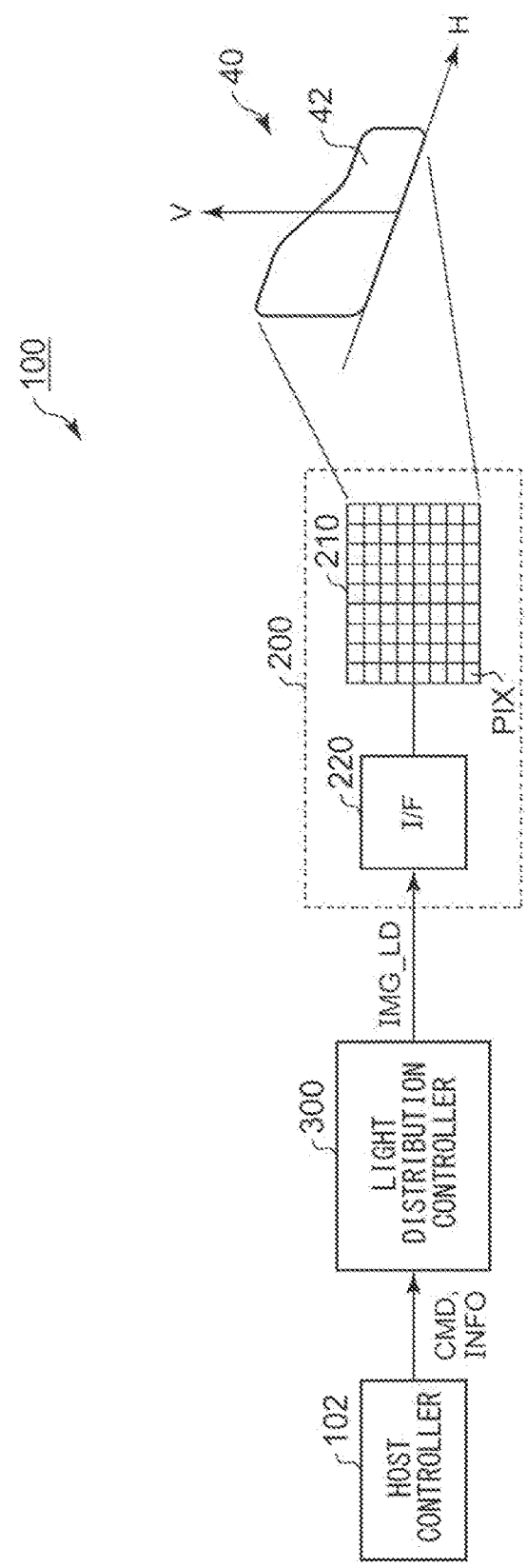
FIG. 2 is a block diagram of the lamp system according to the embodiment.

FIG. 2 is a block diagram of the lamp system 100 according to the embodiment. The lamp system 100 is an ADB lamp, and includes a host controller 102, a light distribution variable lamp 200, and a light distribution controller 300.

The light distribution variable lamp 200 includes a plurality of pixels PIX arranged in an array. For example, the light distribution variable lamp 200 includes an LED array device 210 and an interface circuit 220. The LED array device 210 is an array of a plurality of light emitting pixels PIX, and each light emitting pixel PIX can be individually turned on (putting the light on) and turned off (putting the light out). The light emitting pixel PIX may include, for example, a semiconductor light emitting element such as an LED, and a current source that supplies a drive current to the semiconductor light emitting element.

The emission beam of the LED array device 210 is emitted onto the virtual vertical screen 40 through an optical system (not illustrated). A light distribution pattern 42 corresponding to on and off of the plurality of light emitting pixels PIX is formed on the virtual vertical screen 40. In the present embodiment, the light distribution variable lamp 200 serves as both a high beam and a low beam, and the emission beam of the LED array device 210 covers the irradiation region of the high beam and the irradiation region of the low beam.

The interface circuit 220 receives a light distribution image data IMG_LD defining the light distribution pattern 42 from the light distribution controller 300. Then, the interface circuit 220 controls on/off of each pixel of the LED array device 210 on the basis of the light distribution image data IMG_LD.

Pulse width modulation (PWM) control is used for gradation expression of the luminance of the light emitting pixels PIX of the LED array device 210. Each pixel of the light distribution image data IMG_LD may represent a luminance value (gradation value) of the light emitting pixel PIX. The interface circuit 220 may generate a PWM signal having a duty cycle corresponding to the pixel value for each pixel of the light distribution image data IMG_LD and control on/off of the corresponding light emitting pixel PIX. That is, the interface circuit 220 has a function of a PWM controller.

In addition to the lighting command CMD from the host controller 102, the light distribution controller 300 is supplied with information INFO necessary for generating the light distribution pattern 42. The host controller 102 may be an electronic control unit (ECU) on the vehicle side or an ECU on the lighting device side. Specifically, a lighting command CMD for instructing on/off of a low beam or a high beam is input from the host controller 102 to the light distribution controller 300.

The information INFO supplied from the host controller 102 to the light distribution controller 300 may include surrounding environment information and vehicle information. The surrounding environment information may include (i) information related to a target such as a preceding vehicle, an oncoming vehicle, a pedestrian, a sign, or a delineator, (ii) road information (information on a section such as a highway, a general road, a suburb, and an urban area, whether it is a straight road or a curved road, and the like), and (iii) information such as weather, good or bad visibility, and a state of a road surface. The vehicle information may include a vehicle speed, a steering angle, an inclination angle of the vehicle, and the like.

Figure 3:
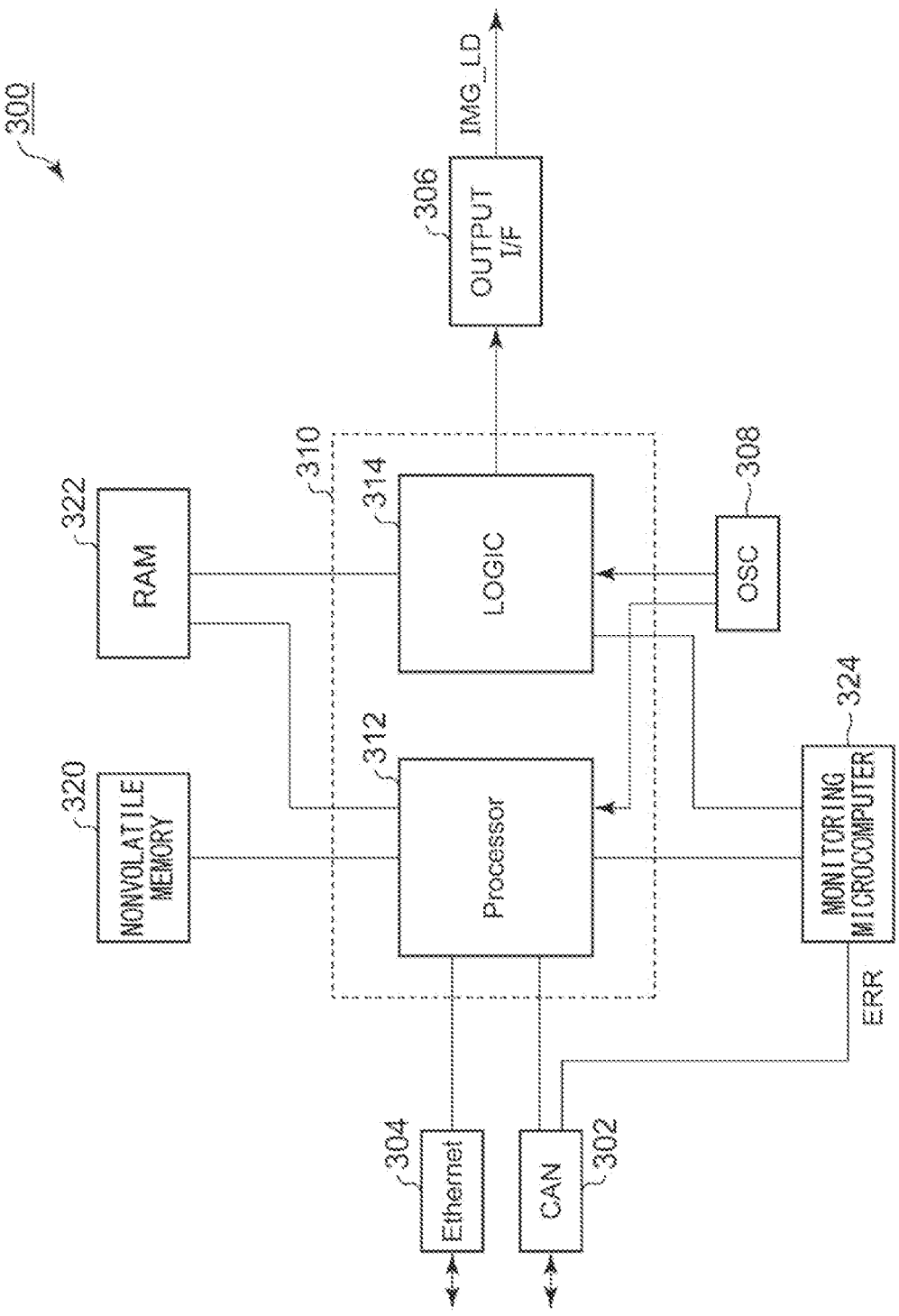
FIG. 3 is a block diagram illustrating a configuration of a light distribution controller.

FIG. 3 is a block diagram illustrating a configuration of a light distribution controller 300. The vehicle bus interface 302 is a controller area network (CAN), a local interconnect network (LIN), or the like, and is provided for communication with the host controller 102 and other devices.

The light distribution controller 300 generates light distribution image data IMG_LD defining the light distribution pattern 42 on the basis of the information INFO from the host controller 102, and transmits the light distribution image data IMG_LD to the light distribution variable lamp 200. The light distribution controller 300 and the light distribution variable lamp 200 are connected by a serial interface for an image such as HDMI (High-Definition Multimedia Interface, registered trademark).

In a case where a larger capacity of data is transmitted with the host controller 102 or another device, a broadband interface 304 may be provided. As the broadband interface 304, Ethernet (registered trademark) or the like can be used.

The output interface 306 transmits the light distribution image data IMG_LD generated by the signal processor 310. The output interface 306 is an HDMI interface (transmitter) or other video interface.

The light distribution controller 300 includes a signal processor 310 that generates light distribution image data IMG_LD. The signal processor 310 includes a processor 312 and a hardware logic circuit 314. The signal processor 310 may be a system-on-a-chip (SOC). The oscillator 308 generates a clock signal and supplies the clock signal to the processor 312 and the hardware logic circuit 314. The processor 312 and the hardware logic circuit 314 operate in synchronization with a clock signal.

The processor 312 receives the lighting command CMD and the information IMFO via the vehicle bus interface 302 and the broadband interface 304.

The nonvolatile memory 320 is a flash memory, a read only memory (ROM), a ferroelectric memory, a magnetoresistive RAM, or the like, and stores a software program to be executed by the processor 312. The processor 312 executes the program loaded from the nonvolatile memory 320 and executes a part of the processing for generating the light distribution image data IMG_LD.

The volatile memory 322 is used by the signal processor 310, and is used as a video memory that stores an image and data necessary for generating the light distribution image data IMG_LD in addition to storing the software program loaded from the processor 312. The volatile memory 322 is a random access memory (RAM) such as a dynamic RAM (DRAM) or a synchronous DRAM (SDRAM). The volatile memory 322 includes a video memory region, and the video memory region includes first region A1 to the third region A3.

By executing the software program, the processor 312 writes the first layer image L1 defining the light distribution of the high beam in the first region A1 of the volatile memory 322, writes the second layer image L2 defining the light-shielding portion of the high beam in the second region A2 of the volatile memory 322, and writes the third layer image L3 defining the light distribution of the low beam in the third region A3 of the volatile memory 322.

A hardware logic circuit 314 and a programmable logic device in which a designer can define and change a logic circuit are provided. The hardware logic circuit 314 reads the first layer image L1 to the third layer image L3 from the first region A1 to the third region A3 of the volatile memory 322, and synthesizes the first layer image L1 to the third layer image L3 to generate the light distribution image data IMG_LD.

Note that the hardware logic circuit 314 may be configured by an application specific integrated circuit (ASIC).

A monitoring microcontroller 324 monitors an operation state of each block of the light distribution controller 300 and determines whether there is an abnormality. When detecting an abnormality in the processor 312, the hardware logic circuit 314, the oscillator 308, or the output interface 306, the monitoring microcontroller 324 transmits an error signal ERR to the host controller 102 via the vehicle bus interface 302.

Figure 4:
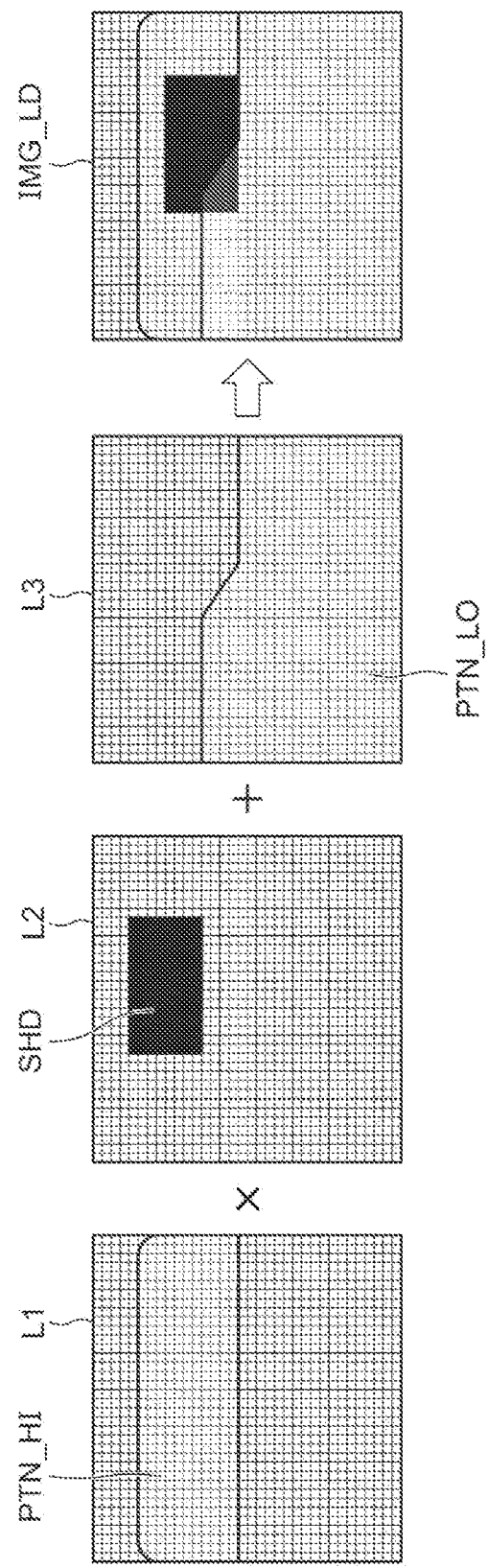
FIG. 4 is a diagram for explaining the operation of the light distribution controller of FIG. 3.
Figure 5:
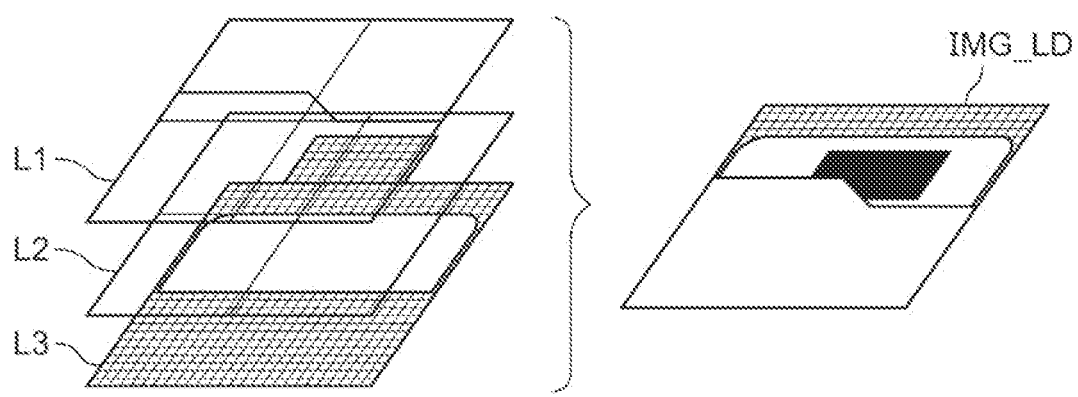
FIG. 5 is a diagram for explaining multilayer synthesis processing based on alpha blending or addition synthesis.

The above is the configuration of the light distribution controller 300. Next, the operation of the light distribution controller 300 will be described. FIG. 4 is a diagram for explaining the operation of the light distribution controller 300 of FIG. 3. FIG. 5 is a diagram for explaining multilayer synthesis processing based on alpha blending or addition synthesis. The first layer image L1 to the third layer image L3 are image data each having the same resolution as that of the LED array device 210 of the light distribution variable lamp 200.

The first layer image L1 defines a light distribution pattern PTN_HI of the high beam. The second layer image L2 defines the light-shielding portion SHD of the high beam. The third layer image L3 defines a light distribution pattern PTN_LO of the low beam. These images are generated by the processor 312 executing a software program, and are written in the first region A1 to the third region A3 of the video memory of the volatile memory 322. The pixel values of the first layer image L1 and the third layer image L3 correspond to the luminance value (duty cycle in PWM control) of the corresponding light emitting element 212.

The hardware logic circuit 314 synthesizes the layer images L1 to L3 written in the first region A1 to the third region A3 to generate the light distribution image data IMG_LD. Some examples of the image synthesis processing will be described.

First Example

The second layer image L2 defining the light-shielding portion SHD is, most simply, 1-bit monochrome image data, a value 0 is associated with light shielding, a value 1 is associated with irradiation, a pixel value inside the light-shielding portion SHD is 0, and a pixel value outside the light-shielding portion SHD is 1.

In this case, the hardware logic circuit 314 can generate the light distribution image data IMD_LD on the basis of the following Arithmetic Equation (1) for the values of the corresponding pixels of the first layer image L1 to the third layer image L3.

$$IMD\_LD[x,y]=L1[x,y] \times L2[x,y]+L3[x,y] \quad (1)$$

Li[x, y] represents a pixel value at a position [x, y] of the i-th layer image. By this calculation, the light-shielding portion SHD does not affect the light distribution of the low beam.

Second Example

In the first embodiment, since the difference in brightness increases at the boundary of the light-shielding portion SHD, it may be difficult for the driver to see. Therefore, the second layer image L2 may be used as multi-bit (m-bit) image data, and image synthesis may be performed on the basis of an alpha blending method. In this case, each pixel value L2[x, y] of the second layer image L2 represents an alpha value. When m=8, the pixel having the pixel value L2[x, y] of 0 in the light-shielding portion is completely light-shielded, and the degree of light-shielding is weakened as the pixel value increases. Alpha blending is represented by the following Equation (2).

$$IMD\_LD[x,y]=(L1[x,y]-L3[x,y]) \times (L2[x,y]/(2^m-1))+L3[x,y] \quad (2)$$

According to this method, by gradually changing the pixel value of the second layer image L2 at the boundary of the light-shielding portion SHD, the brightness difference at the boundary can be suppressed.

Third Example

In the third example, similarly to the second example, the second layer image L2 represents an alpha value, but addition synthesis represented by Equation (3) is used for the operation.

$$IMD\_LD[x,y]=L1[x,y] \times (L2[x,y]/(2^m-1))+L3[x,y] \quad (3)$$

In the examples of FIGS. 4 and 5, a case of simultaneous irradiation of a high beam and a low beam is illustrated, but in a case where only a low beam is irradiated, the pixel value of the first layer image L1 may be set to zero. When there is no preceding vehicle or oncoming vehicle, all pixel values of the second layer image L2 may be set to 255.

The above is the operation of the light distribution controller 300. According to the light distribution controller 300, the preprocessing of individually generating the first layer image L1, the second layer image L2, and the third layer image L3 respectively defining the high beam, the light-shielding portion of the high beam, and the low beam is executed by software control by the processor 312, and the post-processing of synthesizing the first layer image L1 to the third layer image L3 is executed by the hardware logic circuit 314. As a result, the load on the processor 312 can be reduced, and a high-resolution light distribution pattern can be generated. Furthermore, by decomposing the elements of the light distribution image data in three layer images L1 to L3, various changes and applications can be made as described later.

In addition, by expressing the light distribution of the high beam in two layers of the first layer image L1 and the second layer image L2, only the second layer image L2 needs to be updated when only the light-shielding portion is moved, and the first layer image L1 does not need to be updated, and thus the load on the processor 312 can be reduced.

Figure 6A:
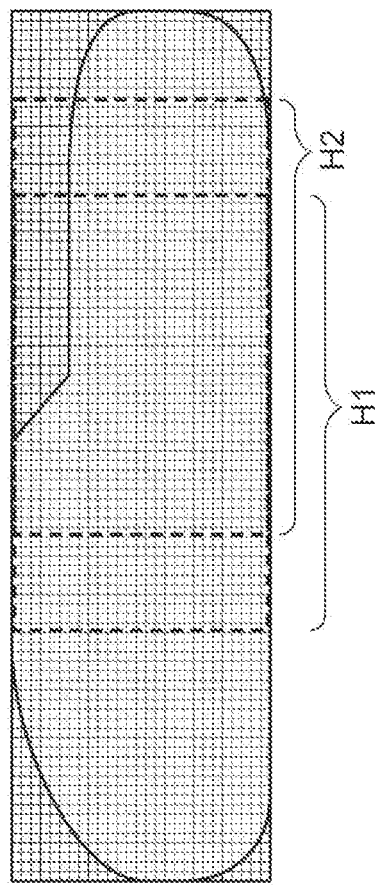
FIGS. 6A and 6B are diagrams for explaining generation of a third layer image.
Figure 6B:
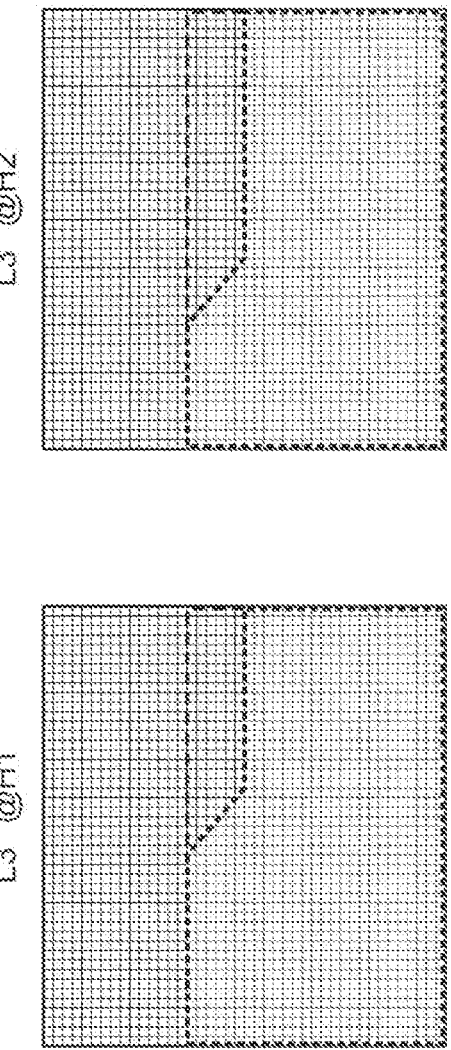

Next, generation processing of the third layer image L3 will be described. FIGS. 6A and 6B are diagrams for explaining generation of a third layer image. FIG. 6A illustrates a reference image IMG_REF defining the light distribution that is the basis of the low beam. A reference image IMG_REF illustrated in FIG. 6A is an image defining a Z-type light distribution of a low beam. The reference image IMG_REF has a larger number of pixels than the third layer image L3 in the horizontal direction, and thus covers a region wider than the irradiation range of the low beam. The reference image IMG_REF may be stored in the non-volatile memory 320 of FIG. 3. Alternatively, when the light distribution controller 300 is activated, the processor 312 may draw a pattern on the basis of a software program and store the pattern in the volatile memory 322. The processor 312 crops a part of the reference image IMG_REF to generate the third layer image L3.

FIG. 6(*b*) illustrates the third layer image L3 when each of the horizontal ranges H1 and H2 is cropped. According to this method, the arithmetic processing amount for the processor 312 to draw the third layer image L3 can be greatly reduced.

For example, the processor 312 may determine the range to be cropped on the basis of a steering angle included in the vehicle information from the host controller 102, road information (a straight road, a curved road, or the like), and the like. As a result, the electronic swivel function can be realized.

Similarly, the reference image IMG_REF may cover a region wider than the irradiation range of the low beam in the vertical direction. The processor 312 may realize the leveling adjustment by changing the crop position of the reference image IMG_REF in the vertical direction.

Next, the light distribution control of the high beam will be described. When traveling on a highway, there is a case where it is desired to form a light distribution in which bright irradiation regions are concentrated in a more central portion. If a plurality of reference images defining a high beam is prepared for each traveling scene, the capacity of the nonvolatile memory increases, which causes an increase in cost.

Therefore, the following processing may be performed in order to switch the light distribution of the high beam corresponding to the traveling scene. FIG. 7 is a diagram for explaining light distribution control of a high beam. A new fourth layer image L4 is added for switching or controlling the high beam light distribution, and the volatile memory 322 further includes a fourth region A4 for storing the fourth layer image L4.

The processor 312 writes the fourth layer image L4 defining the light distribution of the high beam in the fourth region A4. The fourth layer image L4 represents a pattern PTN_HI_ADD added to the basic high beam light distribution defined by the first layer image L1, and from another viewpoint, it is grasped as a difference between the high beam light distribution according to the traveling scene and the basic high beam light distribution.

The hardware logic circuit 314 synthesizes the first layer image L1 to the fourth layer image L4 to generate the light distribution image data IMG_LD. In this case, the second layer image L2 acts on both the first layer image L1 and the fourth layer image L4. In a case where the third layer image L3 is one bit, synthesis based on Equation (1') may be performed.

$$IMD\_LD[x,y]=(L1[x,y]+L4[x,y])\times L2[x,y]+L3[x,y] \quad (1')$$

In a case where the third layer image L3 represents an alpha value, synthesis based on Equation (2') or (3') may be performed.

$$IMD\_LD[x,y]=(L1[x,y]+L4[x,y]-L3[x,y])\times (L2[x,y]/(2^m-1))+L3[x,y] \quad (2')$$

$$IMD\_LD[x,y]=(L1[x,y]+L4[x,y])\times (L2[x,y]/(2^m-1))+L3[x,y] \quad (3')$$

According to this method, by rewriting the fourth layer image L4 according to the traveling scene, light distribution suitable for various traveling scenes can be generated.

The additional pattern PTN_HI_ADD drawn in the fourth layer image L4 may be stored in the nonvolatile memory 320.

Alternatively, the additional pattern PTN_HI_ADD drawn in the fourth layer image L4 may be generated by scaling the pattern PTN_HI drawn in the first layer image L1. In the example of FIG. 7, the additional pattern PTN_HI_ADD is generated by compressing the pattern PTN_HI in the lateral direction. As a result, the additional pattern PTN_HI_ADD does not need to be stored in the nonvolatile memory 320, and an increase in the capacity of the nonvolatile memory 320 can be suppressed.

The drawing position of the additional pattern PTN_HI_ADD may be shifted according to the situation of steering or a curve.

Modification Example 1

The configuration of the light distribution variable lamp 200 to be controlled by the light distribution controller 300 is not particularly limited. For example, the light distribution variable lamp 200 may include a light source that generates a beam having a uniform intensity distribution, and a spatial light modulator that patterns the intensity distribution of the light source. Examples of the spatial light modulator include a digital micromirror device (DMD) and a liquid crystal panel.

Modification Example 2

A transmission method of the light distribution image data IMG_LD from the light distribution controller 300 to the light distribution variable lamp 200 is not particularly limited. For example, when the pixel value of the light distribution image data IMG_LD is n bits ($2^n$ gradations), the light distribution image data IMG_LD may be divided in $2^n$ 1-bit subframes and transmitted. Each pixel of the $2^n$ subframes takes 1 or 0, and the appearance ratio (that is, the duty cycle) of the values 1 and 0 changes according to the corresponding pixel value of the light distribution image data IMG_LD. The light distribution variable lamp 200 turns on a corresponding pixel of the LED array device 210 when a value is 1, and turns off a corresponding pixel of the LED array device 210 when the value is 0, for each pixel of the subframe. That is, the light distribution controller 300 has a function of a PWM controller.

Figure 8:
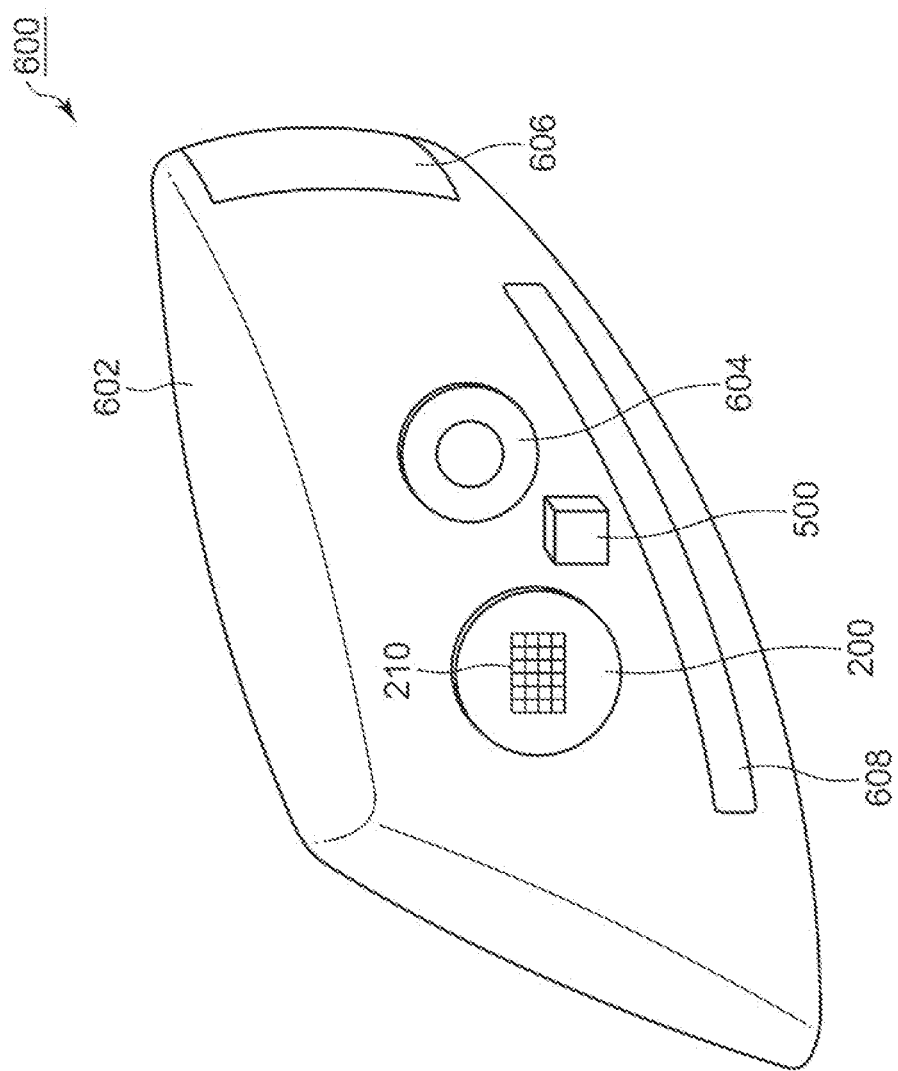
FIG. 8 is a view illustrating a headlamp including the lamp system of FIG. 2.

FIG. 8 is a view illustrating a headlamp 600 including the lamp system 100 of FIG. 2. The headlamp 600 includes a light distribution variable lamp 200 and an image sensor 500. The light distribution (in particular, the light-shielding portion, that is, the second layer image L2) to be generated by the light distribution variable lamp 200 can be generated on the basis of the image captured by the image sensor 500. The light distribution controller 300 may be accommodated in the housing of the headlamp 600 or may be provided outside the housing 602. The headlamp 600 further includes a turn lamp 606 and a position lamp 608. When it is difficult to generate a complete light distribution of a low beam only by the LED array device 210 due to the restriction of the irradiation region that can be covered by the LED array device 210, an auxiliary low beam light source 604 for irradiating a wider region may be added.

Functional Safety

Next, functional safety in the light distribution controller 300 will be described.

Figure 9:
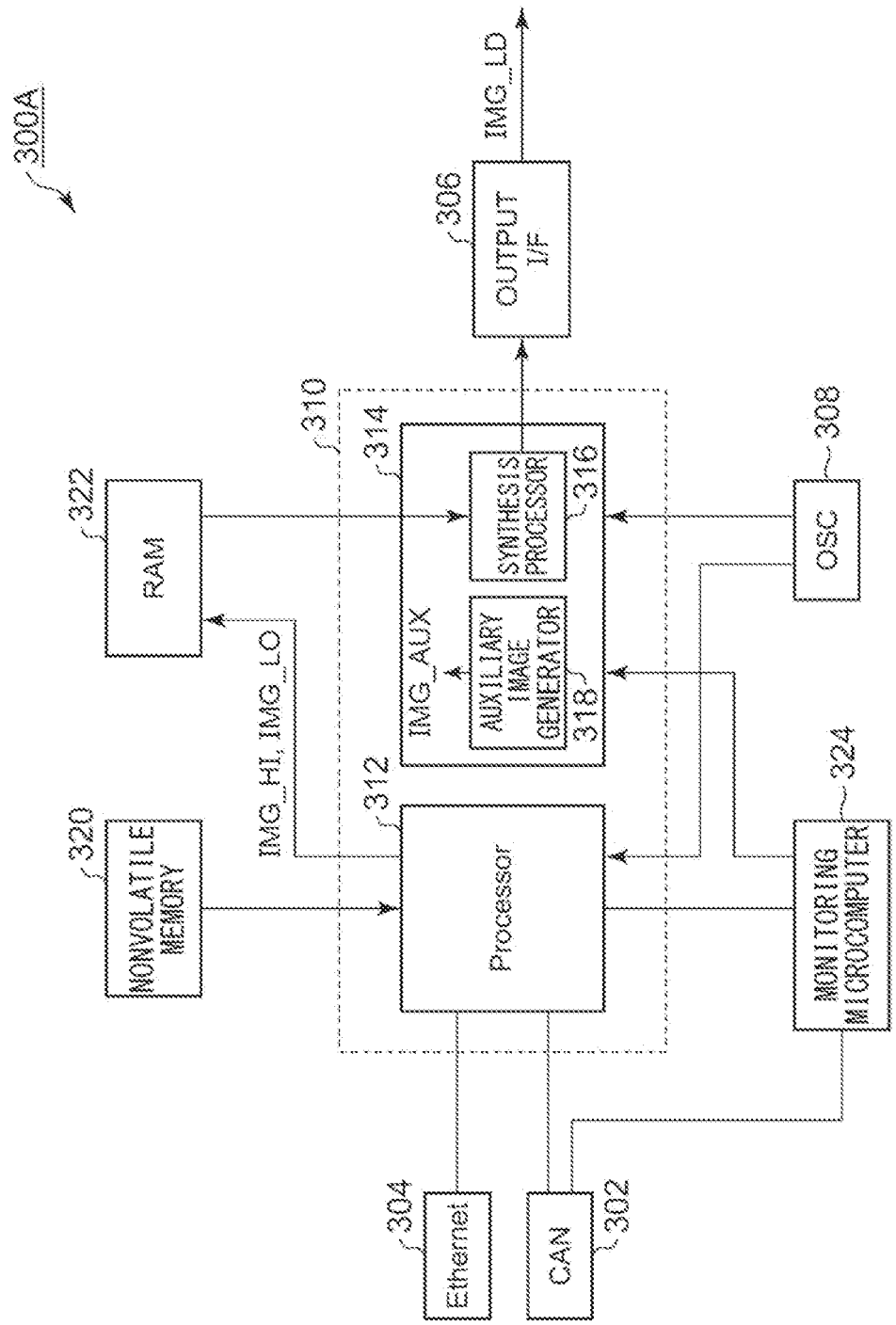
FIG. 9 is a block diagram related to functional safety of the light distribution controller.

FIG. 9 is a block diagram related to functional safety of the light distribution controller. The basic configuration of a light distribution controller 300A is as described with reference to FIG. 3.

The processor 312 executes the software program to generate at least one image defining the light distribution of the light distribution variable lamp 200, and writes the image in the volatile memory 322. In the present embodiment, an image generated by the processor 312 includes a high beam image defining a light distribution of a high beam and a low beam image defining a light distribution of a low beam. The high beam image IMG_HI can be associated with the first layer image L1 and the second layer image L2 (and the fourth layer image L4) explained in the above description, and the low beam image IMG_LO can be associated with the third layer image L3.

In the normal state of the processor 312, the hardware logic circuit 314 generates the light distribution image data IMG_LD on the basis of the high beam image IMG_HI and the low beam image IMG_LO written in the volatile memory 322. The hardware logic circuit 314 includes a synthesis processor 316 and an auxiliary image generator 318. The synthesis processor 316 synthesizes the low beam image IMG_LO and the high beam image IMG_HI to generate light distribution image data IMG_LD.

Note that, in order to exert the functional safety effect described here, the layer configuration is not limited to those illustrated in FIGS. 4 and 7, and it is only required that at least an image describing a high beam and an image describing a low beam are separately written in different regions of the volatile memory 322.

In one example, the processor 312 may write three (or four) layer images L1 to L3 (L4) as the high beam image IMG_HI and the low beam image IMG_LO in the volatile memory 322 as illustrated in FIGS. 4 and 7. In this case, the synthesis processor 316 is structured to be able to synthesize a plurality of layer images based on the above-described arithmetic equations.

In another example, the processor 312 may generate a high beam image IMG_HI in which the light-shielding portion is hollowed out, and write the high beam image IMG_HI together with the low beam image IMG_LO in the volatile memory 322. That is, the processor 312 may execute the synthesis processing of the first layer image L1 and the second layer image L2. In this case, the synthesis processor 316 may synthesize the high beam image IMG_HI and the low beam image IMG_LO to generate light distribution image data IMG_LD.

$$IMG\_LD[x,y]=IMG\_HI[x,y]+IMG\_LO[x,y]$$

A monitoring microcontroller 324 is an abnormality detector capable of detecting an abnormality of the processor 312. When the processor 312 is normal, the processor 312 receives the lighting command CMD of a low beam or a high beam from the host controller 102, but when the processor 312 is abnormal, the control signal CNT corresponding to the lighting command CMD can be received from the host controller 102. The control signal CNT may be received via the vehicle bus interface 302, or may be received via a straight line (not illustrated).

When the monitoring microcontroller 324 detects an abnormality in the processor 312, the operation of the processor 312 is stopped. The abnormality detection method is not particularly limited, and a known technique such as a technique using a watchdog timer may be used. When detecting the abnormality of the processor 312, the monitoring microcontroller 324 notifies the hardware logic circuit 314 of the abnormality.

The auxiliary image generator 318 of the hardware logic circuit 314 is structured to be able to generate or acquire the auxiliary image IMG_AUX without depending on the processor 312 in the abnormal state of the processor 312. The hardware logic circuit 314 generates the light distribution image data IMG_LD on the basis of the auxiliary image IMG_AUX.

When the hardware logic circuit 314 is a programmable logic circuit, the auxiliary image generator 318 may include a pattern generator configured by a combination of a counter and a logic gate. Although it is desirable that the auxiliary image IMG_AUX be close to the normal light distribution of the low beam, in practice, the light distribution of the low beam may be simplified because of limitations of usable hardware.

The above is the configuration of the light distribution controller 300A. The light distribution controller 300A can generate or acquire an auxiliary image IMG_AUX defining a simple light distribution without using the processor 312 in an abnormal state of the processor 312. Therefore, in the abnormal state of the processor 312, the light distribution image data IMG_LD can be generated on the basis of the auxiliary image IMG_AUX, and the lighting of the light distribution variable lamp 200 can be maintained.

Next, some examples of the operation of the light distribution controller 300A in the abnormal state will be described.

Example 1

The auxiliary image generator 318 of the hardware logic circuit 314 writes an auxiliary image IMG_AUX including a predetermined shape in a region of the volatile memory 322 in which the low beam image IMG_LO is written.

After the auxiliary image generator 318 generates and loads the auxiliary image IMG_AUX into the volatile memory 322, the synthesis processor 316 generates the light distribution image data IMG_LD on the basis of the auxiliary image IMG_AUX.

In the abnormal state, the synthesis processor 316 outputs the auxiliary image IMG_AUX read from the volatile memory 322 as it is as the light distribution image data IMG_LD.

Figure 10:
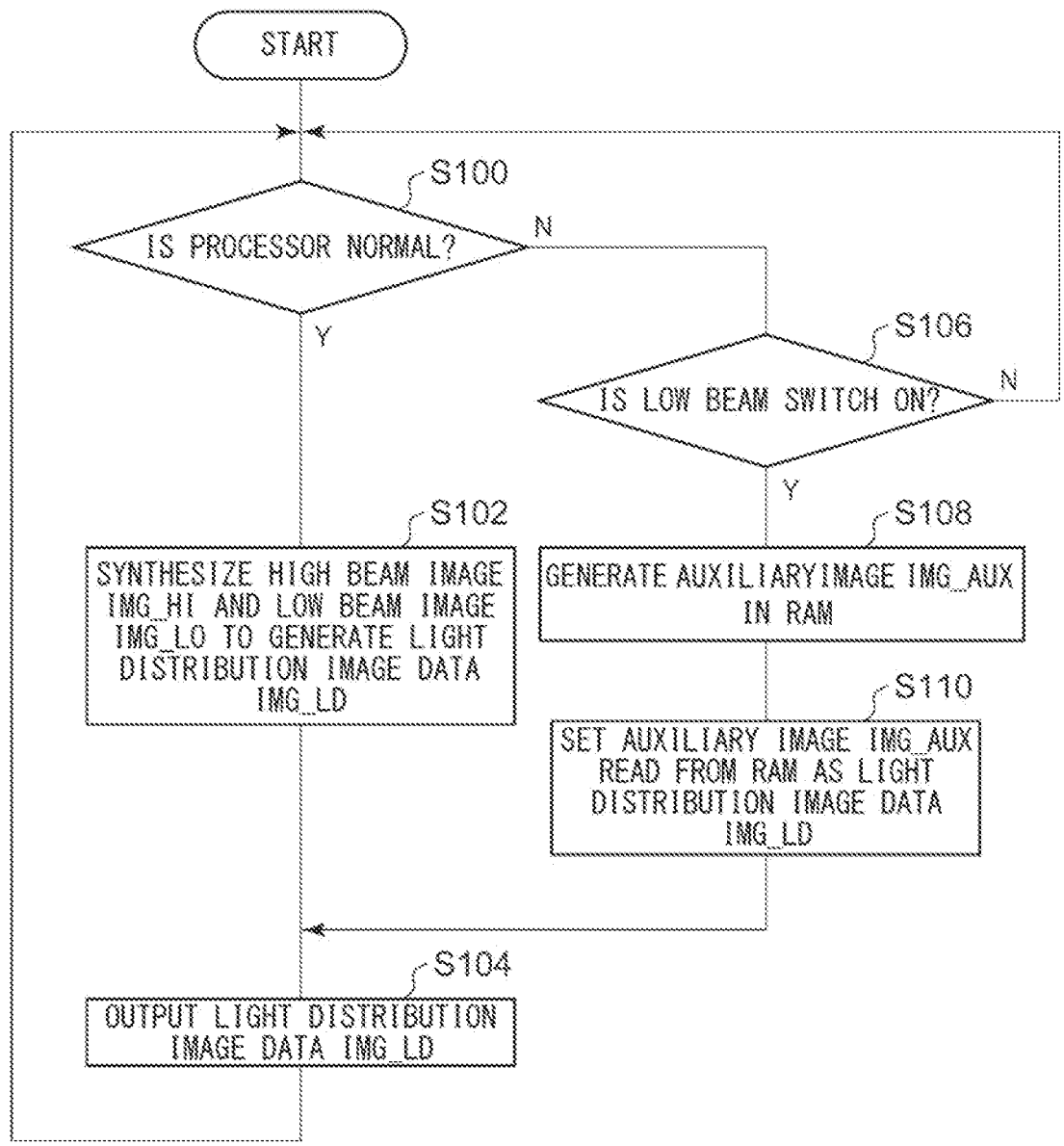
FIG. 10 is a flowchart for explaining the operation of a hardware logic circuit according to Example 1.

FIG. 10 is a flowchart for explaining the operation of the hardware logic circuit 314 according to Example 1. In the normal state of the processor 312 (Y in S100), the hardware logic circuit 314 synthesizes the high beam image IMG_HI and the low beam image IMG_LO of the processor 312 to generate the light distribution image data IMG_LD (S102). The light distribution image data IMG_LD is output to the light distribution variable lamp 200 (S104).

In an abnormal state of the processor 312 (N in S100), the monitoring microcontroller 324 determines whether the low beam switch is on (S106). When the low beam switch is off (N in S106), the process returns to S100. When the low beam switch is on (Y in S106), the hardware logic circuit 314 generates the auxiliary image IMG_AUX in the volatile memory 322 (S108). Then, the auxiliary image IMG_AUX read from the volatile memory 322 is set as the light distribution image data IMG_LD (S110).

The generate of the auxiliary image IMG_AUX on the volatile memory 322 (S108) only needs to be performed once, and the second and subsequent times can be skipped.

Example 2

The auxiliary image generator 318 writes the auxiliary image IMG_AUX in the volatile memory 322, erases the region where the high beam image IMG_HI is written, and resets the pixel value to 0. The synthesis processor 316 performs processing similar to that in the normal state. As a result, the high beam image IMG_HI having a pixel value of 0 and the auxiliary image IMG_AUX written as a substitute for the low beam image IMG_LO are synthesized, and the light distribution image data IMG_LD becomes the same as the auxiliary image IMG_AUX.

Figure 11:
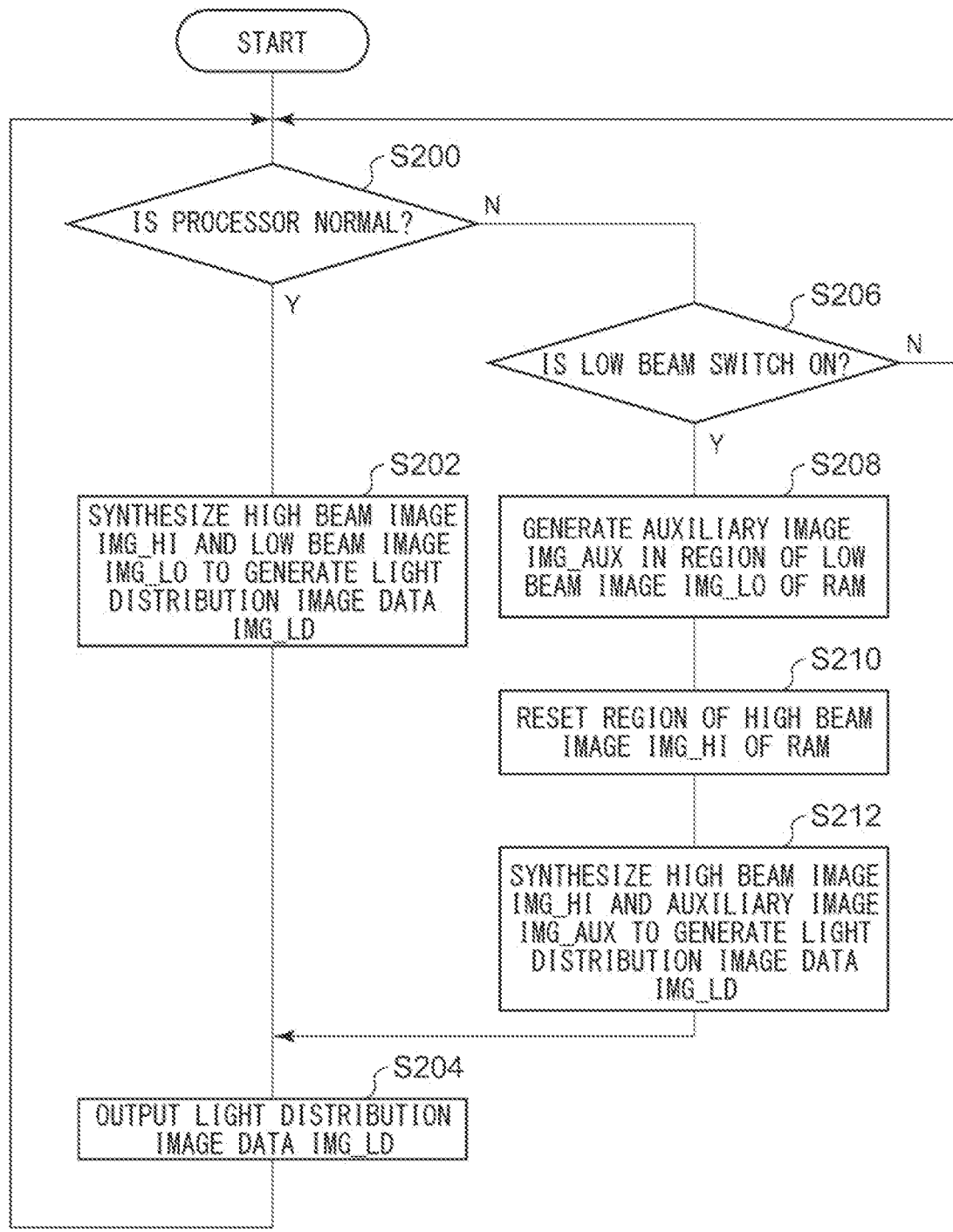
FIG. 11 is a flowchart for explaining the operation of a hardware logic circuit according to Example 2.

FIG. 11 is a flowchart for explaining the operation of the hardware logic circuit 314 according to Example 2. In the normal state of the processor 312 (Y in S200), the hardware logic circuit 314 synthesizes the high beam image IMG_HI and the low beam image IMG_LO of the processor 312 to generate the light distribution image data IMG_LD (S202). The light distribution image data IMG_LD is output to the light distribution variable lamp 200 (S204).

In an abnormal state of the processor 312 (N in S200), it is determined whether the low beam switch is on (S206). When the low beam switch is off (N in S206), the processing returns to S200. When the low beam switch is on (Y in S206), the hardware logic circuit 314 generates the auxiliary image IMG_AUX in the region of the low beam image IMG_LO of the volatile memory 322 (S208). In addition, the region of the high beam image IMG_HI of the volatile memory 322 is reset (S210). Then, the high beam image IMG_HI and the auxiliary image IMG_AUX read from the volatile memory 322 are synthesized to generate the light distribution image data IMG_LD (S212).

Note that processing S208 and S210 may be performed only for the first time, and the second and subsequent times can be skipped.

Example 3

In an abnormal state of the processor 312, the hardware logic circuit 314 directly outputs the auxiliary image IMG_AUX generated by the auxiliary image generator 318 as the light distribution image data IMG_LD without writing the auxiliary image IMG_AUX in the volatile memory 322.

Figure 12:
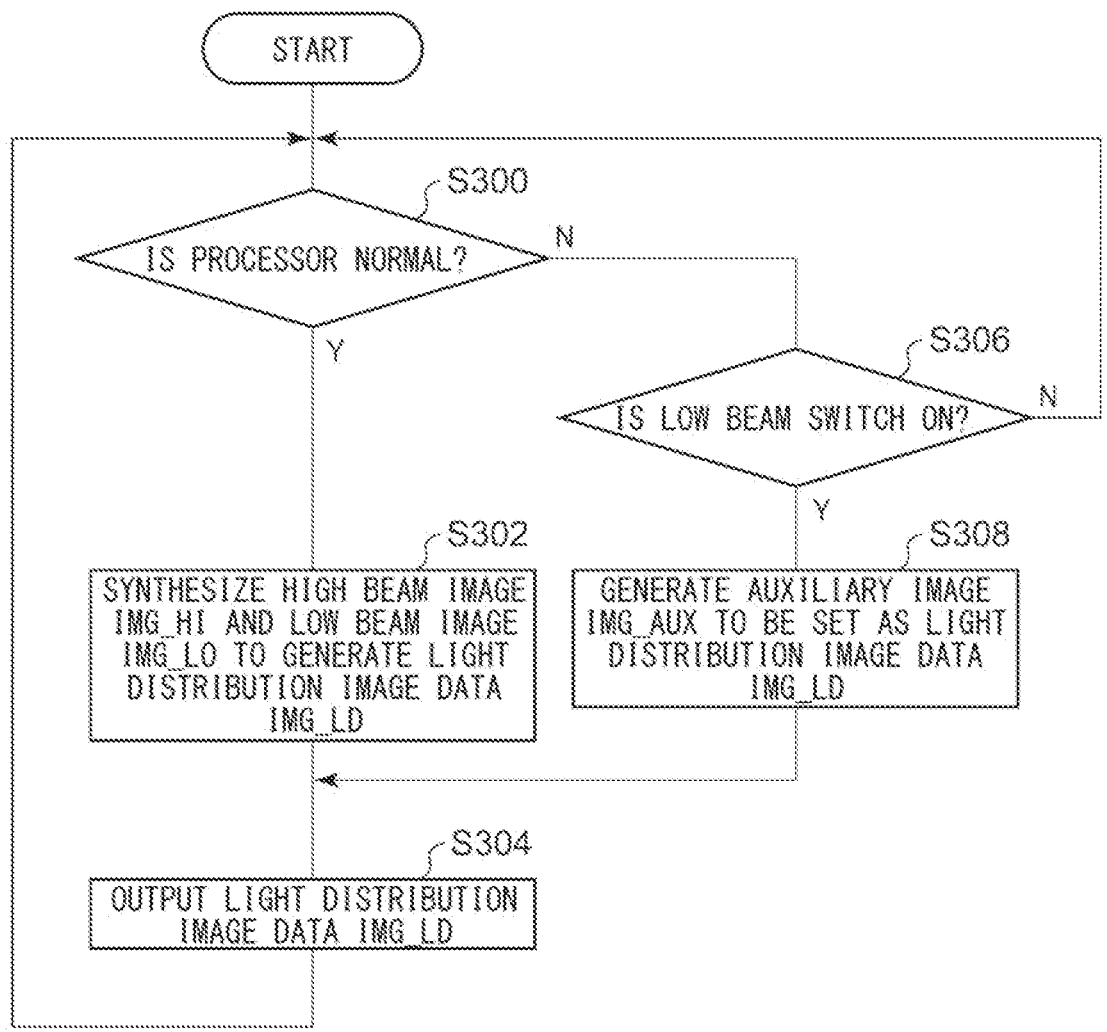
FIG. 12 is a flowchart for explaining the operation of a hardware logic circuit according to Example 3.

FIG. 12 is a flowchart for explaining the operation of the hardware logic circuit 314 according to Example 3. In the normal state of the processor 312 (Y in S300), the hardware logic circuit 314 synthesizes the high beam image IMG_HI and the low beam image IMG_LO of the processor 312 to generate (S302) and then output (S304) the light distribution image data IMG_LD.

In Example 3, since the volatile memory 322 is not used, the auxiliary image IMG_AUX cannot be retained. Therefore, in the abnormal state of the processor 312 (N in S300), when the low beam switch is on (Y in S306), the auxiliary image generator 318 generates the auxiliary image IMG_AUX for each frame rate of the light distribution image data IMG_LD for setting as the light distribution image data IMG_LD (S308). When the low beam switch is off (N in S306), the processing returns to S300.

According to Example 3, access to the volatile memory 322 can be reduced, and heat generation of the volatile memory 322 can be reduced. When the processor 312 is in an abnormal state due to a high temperature, the processor 312 can be prevented from being heated by the memory 322, can be cooled in a short time, and thus can be returned to a normal state.

The control of Example 3 is also effective when an abnormality occurs in the volatile memory 322. In this case, the "processor" in process S300 of FIG. 12 may be replaced with a "volatile memory".

The signal processor 310 may switch the control of Examples 1 to 3 depending on a place or a cause of the abnormality. For example, the control of Example 1 or Example 2 may be performed in an abnormal state of the processor 312, and the control of Example 3 may be performed in an abnormal state of the volatile memory 322.

In addition, in a case where the temperature of the light distribution controller 300A is high in a situation where the processor 312 is abnormal and the volatile memory 322 is normal, the control of Example 3 may be performed.

Next, the auxiliary image IMG_AUX will be described. FIG. 13A is a diagram illustrating an ideal light distribution pattern PTN_LO of a low beam, and FIGS. 13B and 13C are diagrams illustrating an example of an auxiliary image IMG_AUX. The auxiliary image IMG_AUX1 in FIG. 13B is an image in which the light distribution of the low beam is roughened. The auxiliary image IMG_AUX1 of FIG. 13B is suitable for a case where there is a margin in hardware of the auxiliary image generator 318 or a case where the hardware logic circuit 314 is configured by an ASIC.

The auxiliary image IMG_AUX may be further simplified than that in FIG. 13B, and the auxiliary image IMG_AUX in FIG. 13C is merely rectangular. More specifically, in the auxiliary image IMG_AUX2, the pixel value of the region R1 above the horizontal line HL passing through an elbow point P of the low beam light distribution pattern PTN_LO is 0, and the pixel value of the region R2 below the horizontal line HL is non-zero. The auxiliary image IMG_AUX of FIG. 13C can be generated on the volatile memory 322 by extremely simple hardware.

The pixel value of the lower region of the auxiliary image IMG_AUX2 may be uniform. The pixel value in this case may be a minimum value of an upper limit value defined by regulations for each position of the light distribution pattern PTN_LO for a low beam. As a result, glare at the time of pitching can be prevented, and a situation in which the vicinity is too bright and it is difficult to see the distance can be avoided.

Alternatively, the pixel value of the lower region of the auxiliary image IMG_AUX2 may gradually change in the vertical direction. As a result, a steep brightness difference in the vicinity of the cut line can be reduced, and a light distribution that can be easily seen by the driver can be formed.

Next, modifications related to functional safety will be described.

Modification Example 1

When the hardware logic circuit 314 can access the nonvolatile memory 320, the auxiliary image IMG_AUX may be stored in the nonvolatile memory 320 and read.

Modification Example 2

In the embodiment, the processor 312 separately generates the high beam image IMG_HI and the low beam image IMG_LO, and synthesizes the high beam image IMG_HI and the low beam image IMG_LO in the hardware logic circuit 314, but the present invention is not limited thereto. The processor 312 may generate one piece of image data defining the final light distribution of the light distribution variable lamp 200 and write the image data in the volatile memory 322. In this case, in the normal state, the hardware logic circuit 314 reads the image data from the volatile memory 322 and passes the image data to the output interface 306 in the subsequent stage. In the abnormal state, the auxiliary image IMG_AUX is delivered to the output interface 306.

The embodiments merely illustrate the principle and application of the present invention, and many modifications and changes in arrangement are recognized in the embodiments without departing from the spirit of the present invention defined in the claims.

What is claimed is:

1. A light distribution controller structured to control a light distribution variable lamp including a plurality of pixels arranged in an array, the light distribution controller comprising:
   a memory;
   a processor structured to generate at least one image defining a light distribution of the light distribution variable lamp by executing a software program and to write the image in the memory;
   an abnormality detector structured to detect an abnormality of the processor; and
   a hardware logic circuit structured (i) to generate light distribution image data to be output to the light distribution variable lamp based on the at least one image written in the memory in a normal state of the processor, and (ii) to generate the light distribution image data based on an auxiliary image generated independently of the processor in an abnormal state of the processor.

2. The light distribution controller according to claim 1, wherein
   the at least one image includes a high beam image defining a light distribution of a high beam and a low beam image defining a light distribution of a low beam, and
   the hardware logic circuit is structured to synthesize the high beam image and the low beam image to generate the light distribution image data in a normal state of the processor.

3. The light distribution controller according to claim 2, wherein in the abnormal state of the processor, the hardware logic circuit writes an auxiliary image including a predetermined shape in a region of the memory in which the low-beam image is written.

4. The light distribution controller according to claim 2, wherein the processor writes a light-shielding image defining a light-shielding portion of the high beam in the memory, and
the hardware logic circuit generates the light distribution image data on the basis of the high beam image, the low beam image, and the light-shielding image.

5. The light distribution controller according to claim 1, wherein in the abnormal state of the processor, the hardware logic circuit directly outputs the auxiliary image as the light distribution image data without writing the auxiliary image in the memory.

6. The light distribution controller according to claim 1, wherein
the abnormality detector is further structured to be able to detect an abnormality in the memory, and
in the abnormal state of the memory, the hardware logic circuit directly outputs the auxiliary image as the light distribution image data without writing the auxiliary image in the memory.

7. The light distribution controller according to claim 1, wherein the auxiliary image has a pixel value of 0 in a region above the horizontal line passing through an elbow point of the low beam distribution, and a pixel value of non-zero in a region below the horizontal line.

8. The light distribution controller according to claim 7, wherein a pixel value of the lower region of the auxiliary image gradually changes in a vertical direction.

9. The light distribution controller according to claim 7, wherein a pixel value of the lower region of the auxiliary image is uniform.

10. The light distribution controller according to claim 9, wherein a pixel value of the lower region of the auxiliary image is a minimum value of an upper limit value defined for each position in a low beam region.

11. The light distribution controller according to claim 1, wherein the abnormality detector is a microcontroller, and in the abnormal state of the processor, the microcontroller shifts to an operation mode based on the auxiliary image on condition that a control signal indicating a turn-on/off instruction of a low beam is received from a host controller.

12. A vehicle lamp system comprising:
a light distribution controller according to claim 1; and
a light distribution variable lamp controlled on the basis of a light distribution pattern generated by the light distribution controller.

13. A light distribution controller structured to control a light distribution variable lamp including a plurality of pixels arranged in an array, the light distribution controller comprising:
a memory including a first region, a second region, and a third region;
a processor structured to write a first layer image defining a light distribution of a high beam to the first region of the memory, to write a second layer image defining a light-shielding portion of the high beam to the second region of the memory, and to write a third layer image defining a light distribution of a low beam to the third region of the memory by executing a software program; and
a hardware logic circuit structured to read the first layer image to the third layer image stored in the memory, and to synthesize the first layer image to the third layer image to generate light distribution image data.

14. The light distribution controller according to claim 13, wherein each pixel of the second layer image includes an alpha value indicating transmittance of a corresponding pixel of the first layer image, and
the hardware logic circuit is structured to synthesize the first layer image and the third layer image on the basis of the second layer image.

15. The light distribution controller according to claim 14, wherein an alpha value of the second layer image gradually changes at a boundary of the light-shielding portion.

16. The light distribution controller according to claim 13, wherein the processor is structured to generate the third layer image on the basis of a reference image defining a light distribution that is a basis of the low beam.

17. The light distribution controller according to claim 16, wherein the reference image covers a region wider than an irradiation range of the low beam, and
the processor is structured to crop a part of the reference image to generate the third layer image.

18. The light distribution controller according to claim 17, wherein the reference image covers a region wider than the irradiation range of the low beam at least in a horizontal direction, and
the processor is structured to change a horizontal crop position of the reference image so as to perform an electronic swivel.

19. The light distribution controller according to claim 17, wherein the reference image covers a region wider than the irradiation range of the low beam at least in a vertical direction, and
the processor is structured to change a vertical crop position of the reference image so as to perform levelling adjustment.

20. The light distribution controller according to claim 16, further comprising a non-volatile memory that stores the reference image.

21. The light distribution controller according to claim 13, wherein
the memory further includes a fourth region, and
the processor is structured to write a fourth layer image defining a light distribution of the high beam in the fourth region of the memory, and
the hardware logic circuit is structured to generate the light distribution image data by synthesizing the first layer image to the fourth layer image stored in the memory.

22. The light distribution controller according to claim 21, wherein the processor is structured to generate a pattern drawn in the fourth layer image by scaling a pattern drawn in the first layer image.

23. A vehicle lamp system comprising:
a light distribution controller according to claim 13; and
a light distribution variable lamp controlled on the basis of a light distribution pattern generated by the light distribution controller.

24. A method of controlling a light distribution variable lamp including a plurality of pixels arranged in an array, the method comprising:
writing a first layer image defining a light distribution of a high beam in a first region of a memory;
writing a second layer image defining a light-shielding portion of the high beam in a second region of the memory;
writing a third layer image defining a light distribution of a low beam in a third region of the memory;

synthesizing the first layer image to the third layer image stored in the memory by a hardware logic circuit to generate light distribution image data; and converting a pixel value of each pixel of the light distribution image data into a PWM signal and controlling a corresponding pixel.

* * * * *